United States Patent [19]

Caldwell

[11] 3,856,044
[45] Dec. 24, 1974

[54] PNEUMATICALLY OPERATED DIVERTING RELAY CONSTRUCTION AND SYSTEM UTILIZING THE SAME OR THE LIKE

[75] Inventor: Edward N. Caldwell, Knoxville, Tenn.

[73] Assignee: Robertshaw Controls Company, Richmond, Va.

[22] Filed: Oct. 10, 1973

[21] Appl. No.: 405,131

[52] U.S. Cl.................... 137/625.5, 251/29, 236/47
[51] Int. Cl. ........................................ G05d 23/00
[58] Field of Search ........... 251/29; 137/458, 625.5; 236/47

[56] References Cited
UNITED STATES PATENTS
3,575,343   4/1971   Kreuter et al........................ 236/47

Primary Examiner—Henry T. Klinksiek
Attorney, Agent, or Firm—Candor, Candor & Tassone

[57] ABSTRACT

A pneumatically operated diverting relay construction having first and second pilot relays and a diverting valve operatively associated together, the first pilot relay causing the diverting valve to switch from one condition thereof to another condition thereof when a pneumatic signal that is directed to the first pilot relay reaches a certain high value. The second pilot relay causes the diverting valve to switch from the other condition thereof back to the one condition thereof when the pneumatic signal decreases to a certain low value.

20 Claims, 4 Drawing Figures

3,856,044

PNEUMATICALLY OPERATED DIVERTING RELAY CONSTRUCTION AND SYSTEM UTILIZING THE SAME OR THE LIKE

This invention relates to a pneumatically operated diverting relay construction as well as to a control system utilizing such a relay construction or the like.

It is well known that a diverting valve means can be controlled by a pilot relay means wherein once the pilot relay means receives a certain signal, the pilot relay means will cause the diverting valve means to switch from one condition thereof to another condition thereof and when the magnitude of the pneumatic signal to the pilot relay means changes a certain amount, the pilot relay means causes the diverting valve means to switch back from the other condition thereof to the one condition thereof.

It is a feature of this invention to provide a pair of pilot relay means respectively controlling such a diverting valve means, one of the pilot relay means controlling the diverting valve means when the same receives a pneumatic signal of a certain high value and the other pilot relay means controlling the diverting valve means when the pneumatic signal reaches a certain low value.

In particular, one embodiment of this invention provides a pneumatically operated diverting relay construction comprising first and second pilot relay means and a diverting valve means operatively associated together. The first pilot relay means has means for causing the diverting valve means to switch from one condition thereof to another condition thereof when a pneumatic signal reaches a certain high value. The second pilot relay means has means for causing the diverting valve means to switch from the other condition thereof back to the one condition thereof when the pneumatic signal decreases to a certain low value.

The first pilot relay means has means for selecting within limits the certain high value of the pneumatic signal that is required to cause the first pilot relay means to cause its switching of the diverting valve means.

The second pilot relay means also has means for selecting within limits the certain low value of the pneumatic signal that is required to cause the second pilot relay means to cause its switching of the diverting valve means.

Accordingly, it is an object of this invention to provide an improved diverting relay construction having one or more of the novel features set forth above or hereinafter shown or described.

Another object of this invention is to provide an improved pneumatically operated control system having one or more of the novel features set forth above or hereinafter shown or described.

Other objects, uses and advantages of this invention are apparent from a reading of this description which proceeds with reference to the accompanying drawings forming a part thereof and wherein.

Figure 1:
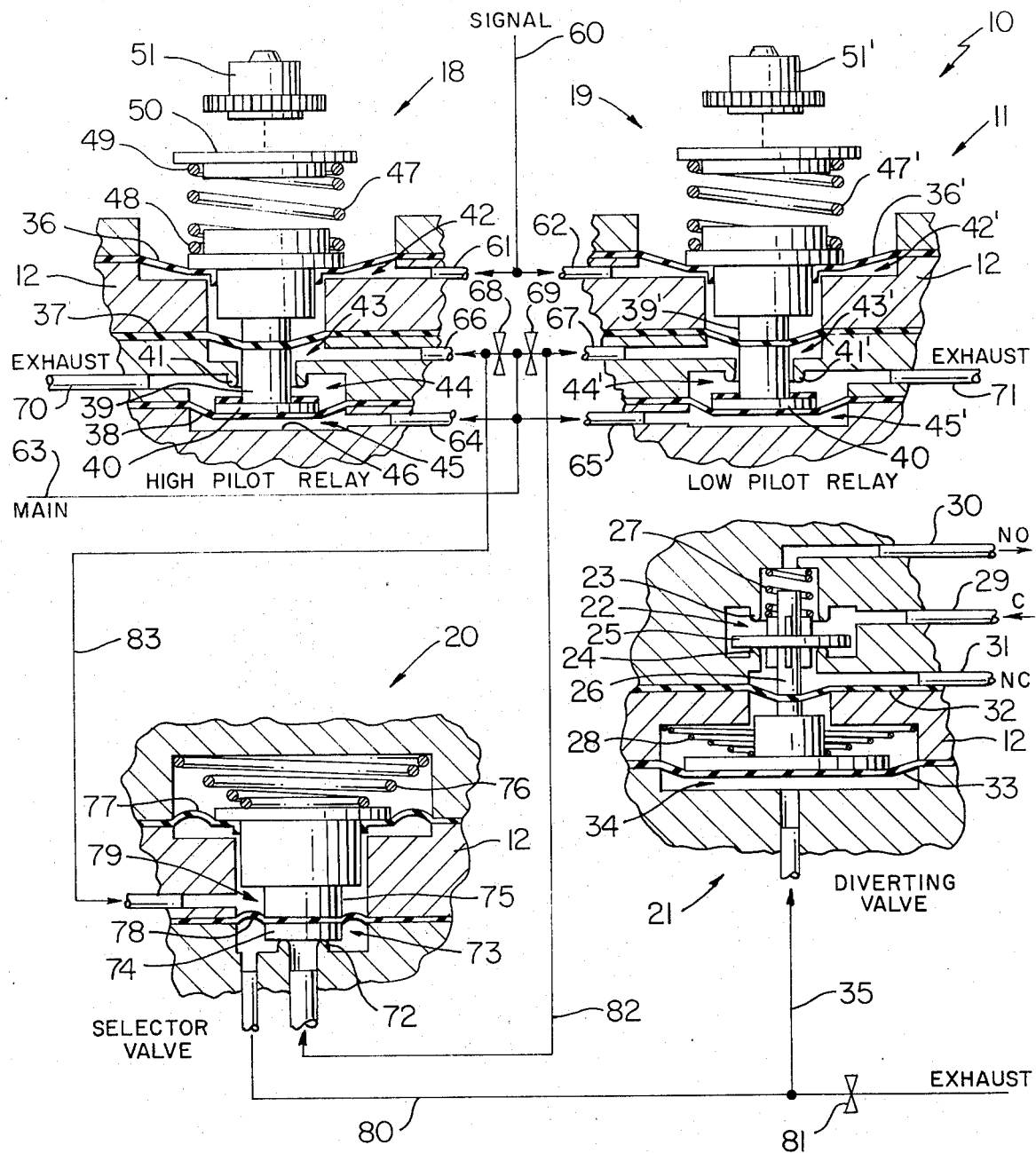
FIG. 1 is a schematic view, partially in cross section, of the improved pneumatically operated diverting valve construction of this invention as utilized in the pneumatically operated control system of this invention.

While the various features of this invention are hereinafter described and illustrated as providing a pneumatically operated control system that operates with pneumatic pressure, it is to be understood that the relay construction and control system of this invention can operate with other fluids, whether the same are pressurized or at sub-atmospheric pressure, as desired.

Therefore, this invention is not to be limited to only the embodiments illustrated in the drawings, because the drawings are merely utilized to illustrate one of the wide variety of uses of this invention.

Referring now to FIG. 1, the improved pneumatically operated control system of this invention is generally indicated by the reference numeral 10 and comprises a relay construction that is generally indicated by the reference numeral 11, the relay construction 11 either having a single housing arrangement or a plurality of separate housing arrangements fluidly interconnected together as illustrated by suitable conduit means or the like. However, the feature of this invention is not to provide a unique package construction of the various parts of the relay construction 11, but is to provide a pneumatically operated diverting relay construction 11 that can be utilized in the pneumatically operated control system 10, whether or not the relay construction is a single item or a plurality of items.

Figure 3:
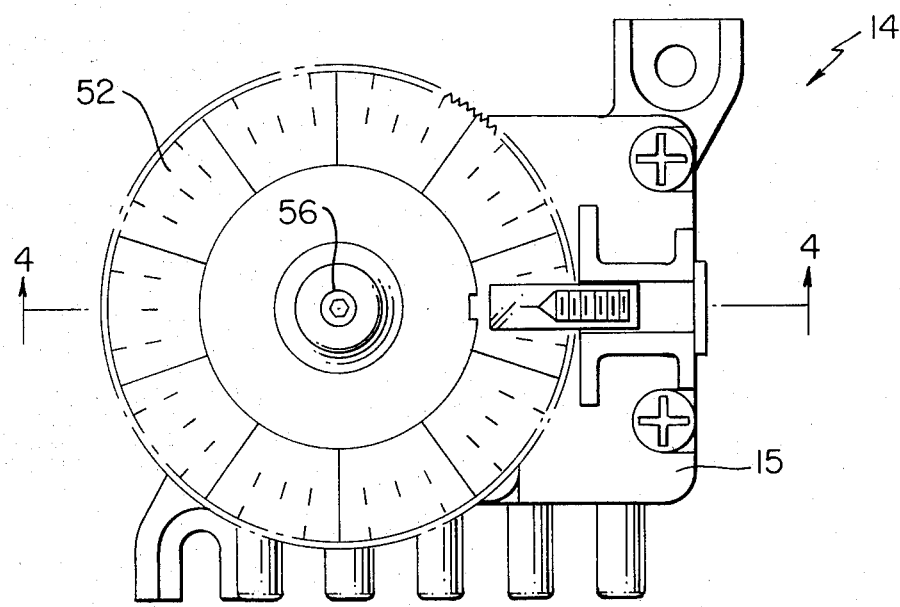
FIG. 3 is a top view of a control device including part of the relay construction of this invention.
Figure 4:
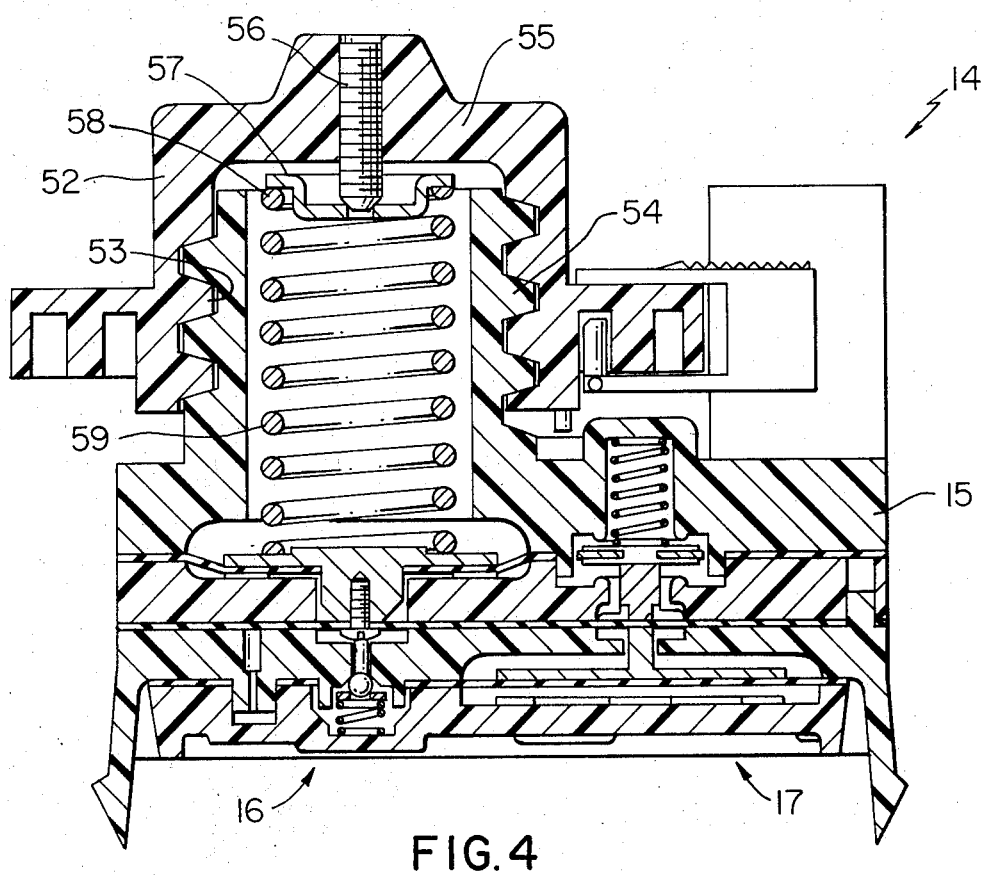
FIG. 4 is an enlarged cross sectional view taken on line 4—4 of FIG. 3.

Therefore, the purposes of illustration, the various parts of the relay construction 11 will be provided in the same housing means 12 in much the same manner that the control device that is generally indicated by the reference numeral 14 in FIGS. 3 and 4 has a single housing means 15 that includes therein a pilot relay means 16 and a diverting valve means 17.

Figure 2:
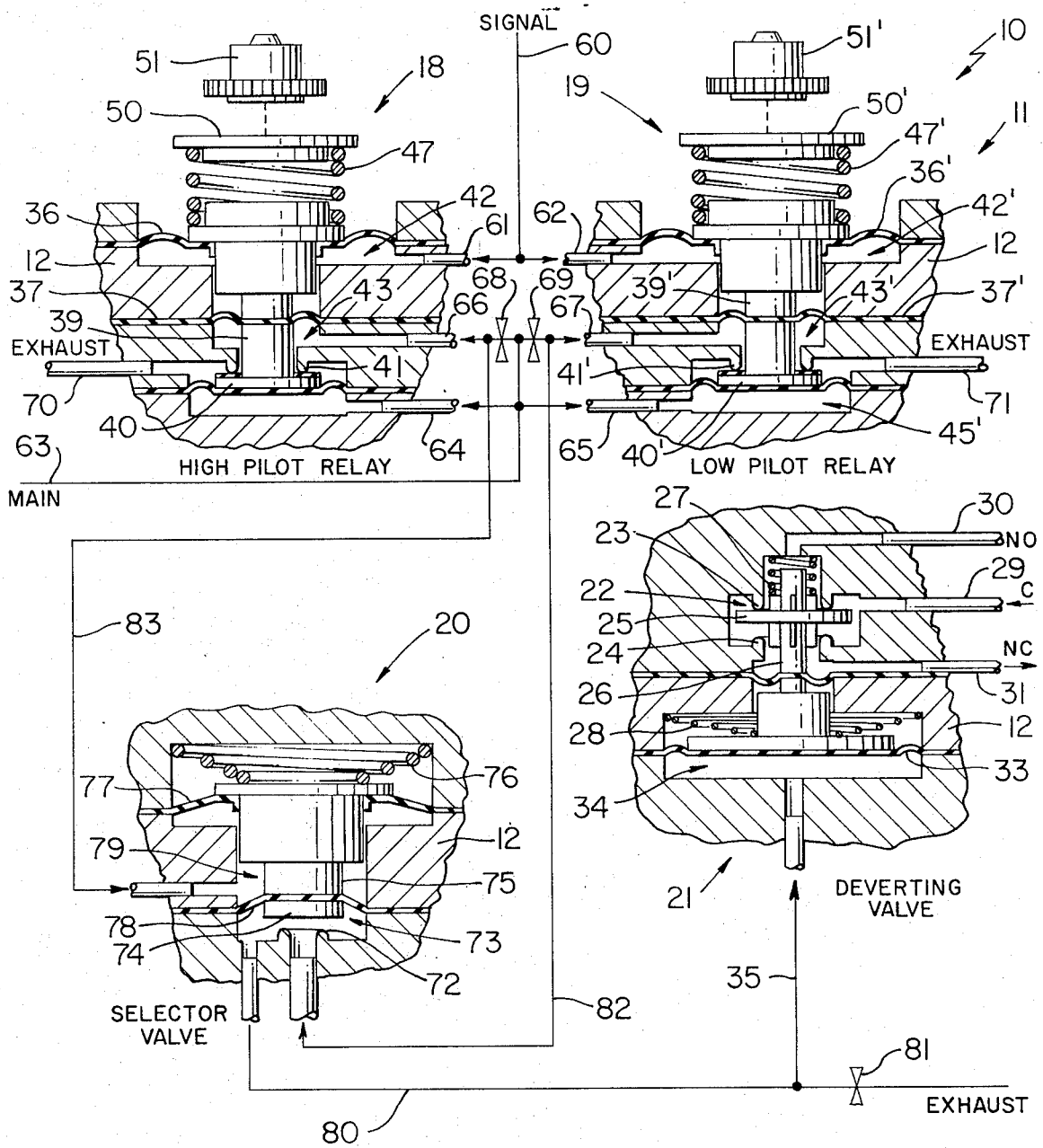
FIG. 2 is a view similar to FIG. 1 and illustrates the control system when the diverting valve is switched from the one operating condition thereof of FIG. 1 to another operating condition thereof.

The control device 14 of FIGS. 3 and 4 is being described and claimed in applicant's concurrently filed copending patent application, Ser. No. 405,132, filed Oct. 10, 1973, and the details thereof need not be described in this application to understand the features of this invention, as the features of this invention are schematically illustrated in FIGS. 1 and 2, with the understanding that the various parts of the relay construction 11 of this invention can be housed in a single housing means in the same manner as the pilot means 16 and diverting valve means 17 are housed in the single housing means 15.

As illustrated in FIG. 1, the housing means 12 includes a first pilot relay means that is generally indicated by the reference numeral 18, a second pilot relay means that is generally indicated by the reference numeral 19, a selector valve means that is generally indicated by the reference numeral 20 and a diverting valve means that is generally indicated by the reference numeral 21.

The diverting valve means 21 includes a chamber 22 in the housing means 12 that has a pair of opposed valve seats 23 and 24 leading respectively thereto and adapted to be controlled by a movable valve member 25 carried by a valve stack 26 that is normally urged downwardly by a first compression spring 27 and a second compression spring 28 as illustrated. In this manner, the valve member 25 is normally disposed in a closed position against the valve seat 24 while the valve seat 23 is opened to the chamber 22. The chamber 22 is adapted to be supplied pressure fluid by a supply conduit means 29 and the valve seats 23 and 24 are adapted to be respectively interconnected to pneumatically operated control devices or other structures (not shown) by conduit means 30 and 31 as illustrated.

Thus, the supply conduit 29 is normally interconnected to the normally open conduit means 30 by the valve member 25 while the normally closed conduit means 31 is normally disconnected from the supply conduit 29. However, when the valve member 25 is moved upwardly in a manner hereinafter described and in the manner illustrated in FIG. 2 to close the valve seat 23 and open the valve seat 24, the supply conduit 29 is disconnected from the normally opened conduit 30 and is interconnected to the normally closed conduit 31 as illustrated.

Thus, when the control system is in the condition of FIG. 1, the device interconnected to the normally opened conduit 30 is being operated and when the control system 10 is in the condition of FIG. 2, the device interconnected to the normally closed conduit 31 is being operated.

The valve stack 26 of the valve member 25 is operatively interconnected to a pair of flexible diaphragms 32 and 33 with the diaphragm 33 cooperating with the housing means 12 to define a chamber 34 therebetween that is fluidly interconnected to a conduit or passage means 35 for the system 10.

When fluid pressure is received in the chamber 34 of the diverting valve means 21 through the conduit means 35 in a manner hereinafter described, the force of the pressure fluid acting on the under side of the diaphragm 33, moves the valve stack 26, and, thus, valve member 25, upwardly in opposition to the force of the compression springs 27 and 28 in the manner illustrated in FIG. 2 to switch the diverting valve means 21 from its condition illustrated in FIG. 1 to the condition illustrated in FIG. 2 where the supply conduit 29 is interconnected to the normally closed conduit 31. When the fluid pressure in the chamber 34 is exhausted in a manner hereinafter described, the force of the compression springs 27 and 28 moves the valve stack 26 and, thus, the valve member 25, downwardly from the position illustrated in FIG. 2 back to the position illustrated in FIG. 1, where the supply conduit 29 is again interconnected to the normally open conduit 30.

The pilot relay means 18 and 19 are formed in the housing means 12 in substantially the same manner and with substantially the same parts to function substantially in the same manner whereby only the pilot relay means 18 will now be described and like parts of the pilot relay means 19 will be indicated by like reference numerals, followed by a prime mark.

As illustrated in FIG. 1, the pilot relay means 18 includes a plurality of flexible diaphragms 36, 37 and 38 operatively interconnected to a valve stack 39 having a valve member 40 for opening and closing a stationary valve seat 41 of the housing means 12, the diaphragm means 36, 37 and 38 cooperating with suitably shaped cavities of the housing means 12 to define a chamber 42 between the diaphragm means 36 and 37, a chamber 43 between the diaphragm 37 and the valve seat 41, a chamber 44 between the valve seat 41 and the diaphragm 38 and a chamber 45 between the diaphragm 38 and an end wall 46 of the housing 12.

A compression spring 47 has one end 48 bearing against the valve stack 39 and the other end 49 thereof bearing against a spring retainer 50 that is adapted to be moved axially upwardly and downwardly relative to the housing means 12 upon rotation of a control knob means 51 whereby the force of the compression spring 47 acting to move the valve member 40 downwardly relative to the valve seat 41 can be adjusted to a selected value within certain limits of the pilot relay means 18.

For example, it can readily be seen in FIGS. 3 and 4 that a control knob 52 of the control device 14 is adapted to have an internal threaded bore 53 threadedly disposed on an externally threaded tubular part 54 of the housing means 15 whereby the axial position of an end wall 55 of the control knob 52 can be adjusted relative to the housing means 15. The end wall 55 can carry a threaded adjusting member 56 that abuts against a spring retainer 57 against which bears one end 58 of a compression spring 59.

Such a spring adjusting control knob arrangement as illustrated in FIGS. 3 and 4 for the control device 14 can be provided for the control knob 51 and compression spring 47 of the pilot relay means 18 illustrated in FIGS. 1 and 2. However, it is to be understood that other spring adjusting means can be utilized if desired.

A pneumatic signal generating means is indicated by the reference numeral 60 in FIGS. 1 and 2 and is illustrated as a conduit means leading to branch conduits 61 and 62 respectively disposed in fluid communication with the chambers 42 and 42' of the pilot relay means 18 and 19.

A main pressure supply means is indicated by the reference numeral 63 in FIGS. 1 and 2 and is illustrated as a conduit means that is interconnected to branch conduits 64 and 65 respectively leading to the chambers 45 and 45' of the pilot relay means 18 and 19.

The main supply conduit 63 is also illustrated as being interconnected to branch conduits 66 and 67 that lead respectively to the chambers 43 and 43' of the pilot relay means 18 and 19, the branch conduits 66 and 67 respectively having restrictors 68 and 69 disposed therein downstream from the main conduit 63 as illustrated.

The chambers 44 and 44' of the pilot relay means 18 and 19 are respectively adapted to be interconnected to exhaust structure or the atmosphere by conduit means 70 and 71.

The selector valve 20 includes a valve seat 72 formed in the housing means 12 and leading to a chamber 73 of the housing means 12. A valve member 74 is disposed in the housing 12 and forms part of a valve stack 75 that is normally urged downwardly to close the valve member 74 against the valve seat 72 by a compression spring 76.

The valve stack 75 is operatively interconnected to a pair of diaphragms 77 and 78 carried by the housing means 12 and cooperating therewith to define a chamber 79 between the diaphragms 77 and 78, the diaphragm 78 also cooperating with the housing means 12 to define part of the chamber 73 and separate the chamber 73 from the chamber 79.

The chamber 73 of the selector valve means 20 is adapted to be interconnected by a conduit or passage 80 to the conduit or passage 35 leading to the switching chamber 34 of the diverting valve means 21, the conduit 80 having a restrictor 81 therein downstream from the passage 35 and leading to an exhaust structure or the atmosphere for a purpose hereinafter described.

The valve seat 72 of the selector valve means 20 is interconnected by a conduit or passage means 82 to the branch passage 67 of the pilot relay means 19 intermediate the restrictor 69 thereof and the chamber 43' for a purpose hereinafter described.

Similarly, the chamber 79 of the selector valve means 20 is interconnected by a conduit or passage means 83 to the branch conduit or passage 66 intermediate the restrictor 68 and the chamber 43 of the pilot relay means 18.

Therefore, it can be seen that the relay construction 11 of this invention can be formed from a relatively few parts and can be packaged in a single housing means 12, if desired, or can be packaged into four individual housings and pneumatically interconnected together and into the control system 10 by suitable conduit means as illustrated as desired.

The operation of the relay construction 11 and control system 10 will now be described.

Assume that the control devices interconnected to the conduits 30 and 31 of the diverting valve means 21 create a variable output, such as a heat exchange function, and that the signal generating means 60 creates its variable pneumatic signal in relation to the variable output. Also, assume initially that the magnitude of the pneumatic signal being produced by the signal generating means 60 and being delivered to the chambers 42 and 42' is not sufficient to overcome the force of the compression springs 47 and 47' of the pilot relay means 18 and 19. Thus, the pilot relay means 18 and 19 respectively have their valve members 40 and 40' held in the open condition illustrated in FIG. 1 whereby the chambers 43, 44 and 43', 44' are respectively interconnected together by the respective open valve seats 41 and 41' so that the branch supply conduits 66 and 67 that have the main pressure bled therein through the restrictors 68 and 69 are directed to the exhaust or outlets 70 and 71. Accordingly, no fluid pressure can build up respectively in the lines 83 and 82 from the pilot relay means 18 and 19. Since no fluid pressure can build up in the conduit 83 leading from the pilot relay means 18, no fluid pressure builds up in the chamber 79 of the selector valve so that the force of the compression spring 76 is sufficient to maintain the valve member 74 fully closed against the valve seat 72 whereby no fluid pressure from the conduit 82 can pass into the conduit 80, and, thus, to the switching chamber 34 of the diverting valve means 21. Since the chamber 34 is interconnected through the restrictor 81 to exhaust, no fluid pressure can exist in the chamber 34 whereby the force of the compression springs 27 and 28 maintain the valve member 25 in its closed position against valve seat 24 so that the supply conduit 29 is not interconnected to the normally closed conduit 31, but is interconnected through the open valve seat 23 to the normally open conduit 30 to operate the pneumatically operated device interconnected to the conduit 30.

The pilot relay means 18 and 19 are so constructed and arranged that the pilot relay means 18 is adapted to be operated by the pneumatic signal being directed thereto from the signal generating means 60 when the magnitude of the pneumatic signal reaches a certain high value as set by the setting of the compression spring 47 thereof. Similarly, the pilot relay means 19 is adapted to switch back from its condition illustrated in FIG. 2 to the position illustrated in FIG. 1 when the magnitude of the pneumatic signal being generated by the signal generating means 60 falls to a certain low value as determined by the setting of the compression spring 47' of the pilot relay means 19.

Thus, the operator sets the control knob 51 of the pilot relay means 18 to the desired pressure setting thereof that that operator wants the pneumatic signal from the generating means 60 to cause the diverting valve means 21 to switch from the condition illustrated in FIG. 1 to the condition illustrated in FIG. 2. Similarly, the operator sets the control knob 51' of the pilot relay means 19 to the lowest value that he desires the signal from the signal generating means 60 to fall to cause the diverting valve means 21 to switch from the condition illustrated in FIG. 2 back to the condition illustrated in FIG. 1.

In this manner, the relay construction 11 utilizes the pilot relay means 18 to set the high setting for operating the diverting valve means 21 and the pilot relay means 19 for setting the low value of the pneumatic signal that will cause switching of the diverting valve means from the condition illustrated in FIG. 2 back to the condition illustrated in FIG. 1.

In particular, as the magnitude of the pneumatic signal being generated as the signal generating means 60 begins to rise, the force of the fluid in the chamber 42' of the pilot relay means 19 acts on the underside of the diaphragm 36' and when the same reaches a certain value, the force of the fluid in the chamber 42' will overcome the force of the compression spring 47' and move the valve stack 39' and valve member 40' thereof upwardly from the position illustrated in FIG. 2 and thereby close the valve member 40' against the valve seat 41'. At this time, since the chamber 43' is no longer interconnected to the exhaust 71, fluid pressure bleeding through the restrictor 69 to the chamber 43' from the main supply 63 can begin to build up and such fluid pressure or pilot output is directed by the conduit 82 to the valve seat 72 of the selector valve means 20. However, since the valve part 74 of the selector valve means 20 is held against the valve seat 72 by the compression spring 76, such fluid pressure in the line 82 is prevented from being directed to the conduit 80 and, thus, to the switching chamber 34 of the diverting valve means 21.

Since the compression spring 47' of the pilot relay means 19 is set for a low setting thereof, the pilot relay means 19 moves from the position illustrated in FIG. 1 to the position illustrated in FIG. 2 before the pilot relay means 18 moves from the conditiion illustrated in FIG. 1 to the condition illustrated in FIG. 2.

However, as the magnitude of the pneumatic signal from the signal generating means 60 increases, the same eventually raises to the value of the setting of the control knob 51 and by acting on the underside of the diaphragm 36 overcomes the force of the compression spring 47 and moves the diaphragm stack 39 and valve member 40 upwardly from the position illustrated in FIG. 1 to the position illustrated in FIG. 2 whereby the valve member 40 closes the valve seat 41 and permits the fluid pressure bleeding into the chamber 43 from the main supply 63 to begin to build up as the chamber 43 is no longer interconnected to the exhaust 70.

When the pressure in the chamber 43 of the pilot valve means 18 build up to a certain value, the same pressure or pilot output is acting in the chamber 79 of the selector valve means 20 in such a manner that the same acts on the underside of the diaphragm 77 to overcome the force of the compression spring 76 and thereby moves the valve stack 75 upwardly so that the valve member 74 is moved away from the valve seat 72 to open the same as illustrated in FIG. 2. In this manner, the pressure from the chamber 43' of the already switched pilot relay means 19 can be directed from the conduit 82 through the open valve seat 72 and chamber 73 into the conduit 80 and, thus, into the switching chamber 34 of the diverting valve means to overcome the force of the compression springs 27 and 28 and move the diverting valve member 25 upwardly from the position illustrated in FIG. 1 to the position illustrated in FIG. 2 to switch the supply conduit 29 from the conduit 30 to the conduit 31 and maintain the supply conduit 29 in fluid communication with the conduit 31 until the magnitude of the signal being produced by the signal generating means 60 falls to the low value thereof as set by the control knob 51' of the low pilot relay means 19.

In particular, with the control system 10 now in the condition illustrated in FIG. 2, should the value of the pneumatic signal being produced by the signal generating means 60 begin to decrease, the same must fall to a certain value below the value setting of the control knob 51 of the pilot relay means 18 before the pilot relay means 18 will switch back from the condition illustrated in FIG. 2 to the position illustrated in FIG. 1 because once the relay 18 has been switched from the condition illustrated in FIG. 1 to the condition illustrated in FIG. 2, the force of the fluid now in the chamber 43 acts on the under side of the diaphragm 37 to assist in holding the valve stack 39 and valve member 40 in the up condition illustrated in FIG. 2 to oppose the force of the compression spring 47 tending to open the valve member 40. Thus, the value of the pressure signal in the chamber 42 must fall a fixed differential below the setting of the compression spring 47 before the force of the compression spring 47 can move the valve member 40 from the closed condition illustrated in FIG. 2 back to the open condition illustrated in FIG. 1 and at that time the opening of the valve member 40 causes the chamber 43 to exhaust its pressure to the exhaust 70 and, thus, exhaust the pressure in the chamber 79 of the selector valve means 20 as the valve seat 41 is now maintained open to the exhaust 70.

However, the selector valve means 20 remains in the condition illustrated in FIG. 2 even though the chamber 79 is now exhausted because the pilot output from the pilot valve mans 19 is now existing in the chamber 73 of the selector valve means 20 and is acting on the under side of the diaphragm 78 to oppose the force of the compression spring 76 tending to drive the valve member 74 downwardly even though the fluid pressure or pilot output in the chamber 79 has now ceased to exist through the opening of the valve member 40 of the high pilot relay means 18.

Thus, the value of the pneumatic signal being produced by the signal generating means 60 continues to decrease until the same reaches the value as set by the control knob 51' of the low pilot relay means 19 whereby the force of the compression spring 47' now overcomes the force of the pressure in the chamber 42' acting on the under side of the diaphragm 36', as well as the force of the pressure in the chamber 43' acting on the under side of the diaphragm 37', and moves the valve member 40' from the closed position illustrated in FIG. 2 to the open position illustrated in FIG. 1 whereby the fluid pressure or pilot output in the chamber 43' is now dumped to the exhaust 71 through the open valve seat 41'. This loss in pressure in the chamber 43' also causes a loss of pressure in the chamber 73 of the selector valve 20 and the chamber 34 of the diverting valve means 21 so that the compression spring 76 of the selector valve means 20 will move the valve member 74 downwardly to its closed position illustrated in FIG. 1 and the force of the compression springs 27 and 28 of the diverting valve means 21 will move the valve member 25 downwardly to switch the supply conduit 29 from the normally closed conduit 31 back to the normally open conduit 30 as illustrated in FIG. 1, any remaining pressure in the chamber 34 of the diverting valve means 21 being bled to the exhuast through the restrictor 81 whereby the control system is returned completely to the condition illustrated in FIG. 1 until the magnitude of the pneumatic signal from the generating means 60 again builds up to the setting of the high pilot relay means 18.

Thus, it can be seen that the diverting valve means 21 is adapted to be switched from the condition illustrated in FIG. 1 to the condition illustrated in FIG. 2 when the magnitude of the pneumatic signal being produced by the signal generating means 60 reaches the setting of the control knob 51 of the high pilot relay means 18 and the diverting valve means 21 will only be switched back from the condition illustrated in FIG. 2 to the condition illustrated in FIG. 1 when the magnitude of that signal from the signal generating means 60 thereafter falls to a low value as set by the control knob 51' of the low pilot relay means 19.

Accordingly, both the high and low settings for causing the switching of the diverting valve means 21 can be manually and separately adjusted by the control knobs 51 and 51' of the relay means 18 and 19.

Thus, it can be seen that this invention not only provides an improved pneumatically operated diverting relay construction, but also this invention provides an improved pneumatically operated control system While the form of the invention now preferred has been illustrated and described as required by the Patent Statute, it is to be understood that other forms can be utilized and still come within the scope of the appended claims.

What is claimed is:

1. A pneumatically operated diverting relay construction comprising first and second pilot relay means and a diverting valve means operatively associated together, said first pilot relay means having means for causing said diverting valve means to switch from one condition thereof to another condition thereof when a pneumatic signal reaches a certain high value, said second pilot relay means having means for causing said diverting valve means to switch from said other condition thereof to said one condition thereof when said pneumatic signal decreases to a certain low value.

2. A pneumatically operated diverting relay construction as set forth in claim 1 wherein said first pilot relay means has means for selecting within limits the certain high value that is required of said pneumatic signal to cause said first pilot relay means to cause its switching of said diverting valve means.

3. A pneumatically operated diverting relay construction as set forth in claim 1 wherein said second pilot relay means has means for selecting within limits the certain low value that is required of said pneumatic signal to cause said second pilot relay means to cause its switching of said diverting valve means.

4. A pneumatically operated diverting relay construction as set forth in claim 1 wherein said first pilot relay means has means for selecting within limits the certain high value that is required of saie pneumatic signal to cause said first pilot relay means to cause its switching of said diverting valve means and wherein said second pilot relay means has means for selecting within limits the certain low value that is required of said pneumatic signal to cause said second pilot relay means to cause its switching of said diverting valve means.

5. A pneumatically operated diverting relay construction as set forth in claim 1 wherein said means of said first pilot relay means for causing switching of said diverting valve means comprises means for sending a first pneumatic pilot output when said first pilot relay means receiving said pneumatic signal at said certain high value thereof.

6. A pneumatically operated diverting relay construction as set forth in claim 5 wherein said means of said second pilot relay means for causing switching of said diverting valve means comprises means for terminating a second pneumatic pilot output when said second pilot relay means receives said pneumatic signal at said certain low value thereof.

7. A pneumatically operated diverting relay construction as set forth in claim 6 wherein a selector valve means is operatively associated with said first and second pilot relay means and said diverting valve means, said selector valve means having means for directing said second pilot output to said diverting valve means to cause the same to switch from said one condition thereof to said other condition thereof when said selector valve means receives said first pilot output.

8. A pneumatically operated diverting relay construction as set forth in claim 7 wherein said selector valve means has a valve member for controlling the flow of said second pilot output to said diverting valve means, said valve member being moved to its open position by said first pilot output when said selector valve means receives said first pilot output and being held in said open position by said second pilot output as long as said second pilot output continues to exist even though said first pilot output subsequently terminates whereby said valve member closes to switch said diverting valve means from said other condition thereof back to said one condition thereof.

9. A pneumatically operated diverting relay construction as set forth in claim 8 wherein at least one of said pilot relay means has means for selecting within limits the certain value that is required of said pneumatic signal to cause that one pilot relay means to cause its switching of said diverting valve means.

10. A pneumatically operated diverting relay construction as set forth in claim 8 wherein each said pilot relay means has means for selecting within limits the certain value that is required of said pneumatic signal to cause the respective pilot relay means to cause its switching of said diverting valve means.

11. A pneumatically operated control system comprising a source of fluid, signal producing means, first and second pilot relay means, and a diverting valve means operatively associated with said first and second pilot relay means, said first pilot relay means having means for causing said diverting valve means to switch from one condition thereof to another condition thereof when said pneumatic signal reaches a certain high value, said second pilot relay means having means for causing said diverting valve means to switch from said other condition thereof to said one condition thereof when said pneumatic signal decreases to a certain low value.

12. A pneumatically operated control system as set forth in claim 11 wherein said first pilot relay means has means for selecting within limits the certain high value that is required of said pneumatic signal to cause said first pilot relay means to cause its switching of said diverting valve means.

13. A pneumatically operated control system as set forth in claim 11 wherein said second pilot relay means has means for selecting within limits the certain low value that is required of said pneumatic signal to cause said second pilot relay means to cause its switching of said diverting valve means.

14. A pneumatically operated control system as set forth in claim 11 wherein said first pilot relay means has means for selecting within limits the certain high value that is required of said pneumatic signal to cause said first pilot relay means to cause its switching of said diverting valve means and wherein said second pilot relay means has means for selecting within limits the certain low value that is required of said pneumatic signal to cause said second pilot relay means to cause its switching of said diverting valve means.

15. A pneumatically operated control system as set forth in claim 11 wherein said means of said first pilot relay means for causing switching of said diverting valve means comprises means for sending a first pneumatic pilot output from said source when said first pilot relay means receives said pneumatic signal at said certain high value thereof.

16. A pneumatically operated control system as set forth in claim 15 wherein said means of said second pilot relay means for causing switching of said diverting valve means comprises means for terminating a second pneumatic pilot output from said source when said second pilot relay means receives said pneumatic signal at said certain low value thereof.

17. A pneumatically operated control system as set forth in claim 16 wherein a selector valve means is operatively associated with said first and second pilot relay means and said diverting valve means, said selector valve means having means for directing said second pilot output to said diverting valve means to cause the same to switch from said one condition thereof to said other condition thereof when said selector valve means receives said first pilot output.

18. A pneumatically operated control system as set forth in claim 17 wherein said selector valve means has a valve member for controlling the flow of said second pilot output to said diverting valve means, said valve member being moved to its open position by said first pilot output when said selector valve means receives said first pilot output and being held in said open position by said second pilot ouput as long as said second pilot output continues to exist even though said first pilot ouput subsequently terminates whereby said valve member closes to switch said diverting valve means from said other condition thereof back to said one condition thereof.

19. A pneumatically operated control system as set forth in claim 18 wherein at least one of said pilot relay means has means for selecting within limits the certain value that is required of said pneumatic signal to cause that one pilot relay means to cause its switching of said diverting valve means.

20. A pneumatically operated control system as set forth in claim 18 wherein each said pilot relay means has means for selecting within limits the certain value that is required of said pneumatic signal to cause the respective pilot relay means to cause its switching of said diverting valve means.

* * * * *